(12) United States Patent
Rich et al.

(10) Patent No.: US 6,440,254 B1
(45) Date of Patent: Aug. 27, 2002

(54) METHOD OF BONDING A LAYER OF MATERIAL TO A SUBSTRATE

(75) Inventors: Barbara J. Rich, Raytown, MO (US); Larry E. Williams, Shawnee, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

(21) Appl. No.: 09/476,267

(22) Filed: Jan. 3, 2000

(51) Int. Cl.[7] .............................................. B32B 31/00
(52) U.S. Cl. ................... 156/272.2; 156/272.8
(58) Field of Search .............................. 156/272.2, 380, 156/583, 515, 272.8

(56) References Cited

U.S. PATENT DOCUMENTS

| | | | |
|---|---|---|---|
| 3,582,466 A | 6/1971 | Quirk | 162/286 |
| 3,614,369 A | 10/1971 | Medley | 219/10.43 |
| 3,769,488 A | 10/1973 | Haslinger | 219/121 |
| 3,860,784 A | * 1/1975 | Brown | 219/121 |
| 3,965,327 A | 6/1976 | Ehlscheid et al. | 219/121 |
| 3,979,591 A | 9/1976 | Silverman | 250/317 |
| 3,981,230 A | * 9/1976 | Lee | 156/380 |
| 4,049,945 A | 9/1977 | Ehlscheid et al. | 219/121 |
| 4,107,528 A | * 8/1978 | Silverman | 250/317 |
| 4,149,918 A | 4/1979 | Cislak | 156/88 |
| 4,160,894 A | 7/1979 | Stemmler et al. | 219/121 |
| 4,161,808 A | 7/1979 | Wittstock | 29/33 |
| 4,240,127 A | 12/1980 | Fanning et al. | 361/304 |
| 4,266,112 A | 5/1981 | Niedermeyer | 219/121 |
| 4,430,548 A | 2/1984 | Macken | 219/121 |
| 4,430,549 A | 2/1984 | Macken | 219/121 |
| 4,458,133 A | 7/1984 | Macken | 219/121 |
| 4,530,061 A | 7/1985 | Henderson et al. | 364/475 |
| 4,537,809 A | * 8/1985 | Ang et al. | 428/41 |
| 4,588,871 A | 5/1986 | Etcheparre et al. | 219/121 |
| 4,634,612 A | 1/1987 | Nelson et al. | 428/4 |
| 4,645,900 A | 2/1987 | Heyden | 219/121 |
| 4,672,172 A | 6/1987 | Pearl | 219/121 |
| 4,680,442 A | 7/1987 | Bauer et al. | 219/121 |
| 4,713,267 A | 12/1987 | Truskolaski | 428/4 |
| 4,762,514 A | 8/1988 | Yoshida | 493/227 |
| 4,782,208 A | 11/1988 | Withrow et al. | 219/121.72 |

(List continued on next page.)

FOREIGN PATENT DOCUMENTS

| | | | |
|---|---|---|---|
| DE | 1 442 002 | 7/1976 | B26F/3/14 |
| FR | 2 310 846 | 12/1976 | B26F/3/14 |

*Primary Examiner*—Merrick Dixon
(74) *Attorney, Agent, or Firm*—Leydig, Voit & Mayer, Ltd.

(57) ABSTRACT

An improved method of bonding a layer of material to a substrate is provided in which a laser beam is used to generate heat in a local area on the composite. The heat from the laser beam activates an adhesive to bond the layer to the substrate. Alternatively, the heat from the laser beam locally melts either or both of the substrate and the layer to create the bond. When the bond is created along a closed path, the heat from the laser may also cause the layer to puff away from the substrate. The invention can be used for a variety of purposes such as creating decorative features on greeting cards to give them a novel look and feel.

22 Claims, 9 Drawing Sheets

U.S. PATENT DOCUMENTS

| | | | |
|---|---|---|---|
| 4,847,462 A | 7/1989 | Soodak et al. | 219/121.63 |
| 4,851,061 A | 7/1989 | Sorkoram | 156/63 |
| 4,856,857 A | 8/1989 | Takeuchi et al. | 350/3.6 |
| 4,945,203 A | 7/1990 | Soodak et al. | 219/121.64 |
| 5,053,171 A | 10/1991 | Portney et al. | 264/1.4 |
| 5,108,669 A | 4/1992 | Van Dijk et al. | 264/25 |
| 5,127,019 A | 6/1992 | Epstein et al. | 372/108 |
| 5,131,957 A | 7/1992 | Epstein et al. | 148/565 |
| 5,183,598 A | 2/1993 | Hellé et al. | 264/22 |
| 5,200,592 A | 4/1993 | Yabu | 219/121.67 |
| 5,205,475 A | 4/1993 | Shibahara et al. | 229/92.8 |
| 5,225,649 A | 7/1993 | Andreoli et al. | 219/121.67 |
| 5,231,262 A | 7/1993 | Matsumura et al. | 219/121.67 |
| 5,250,784 A | 10/1993 | Muller et al. | 219/121.72 |
| 5,262,612 A | 11/1993 | Momany et al. | 219/121.67 |
| 5,346,151 A | 9/1994 | Zimmermann et al. | 242/521 |
| 5,367,141 A | 11/1994 | Piltch | 219/121.67 |
| 5,421,933 A * | 6/1995 | Nedblake et al. | 156/249 |
| 5,436,423 A | 7/1995 | Welty | 219/121.39 |
| 5,444,210 A | 8/1995 | Bingener et al. | 219/121.67 |
| 5,481,083 A | 1/1996 | Smyth, Jr. | 219/121.67 |
| 5,504,301 A | 4/1996 | Eveland | 219/121.67 |
| 5,550,346 A | 8/1996 | Andriash et al. | 219/121.72 |
| 5,611,949 A | 3/1997 | Snellman et al. | 219/121.67 |
| 5,614,339 A | 3/1997 | Tankovich | 430/19 |
| 5,767,481 A | 6/1998 | Graf | 219/121.67 |

* cited by examiner

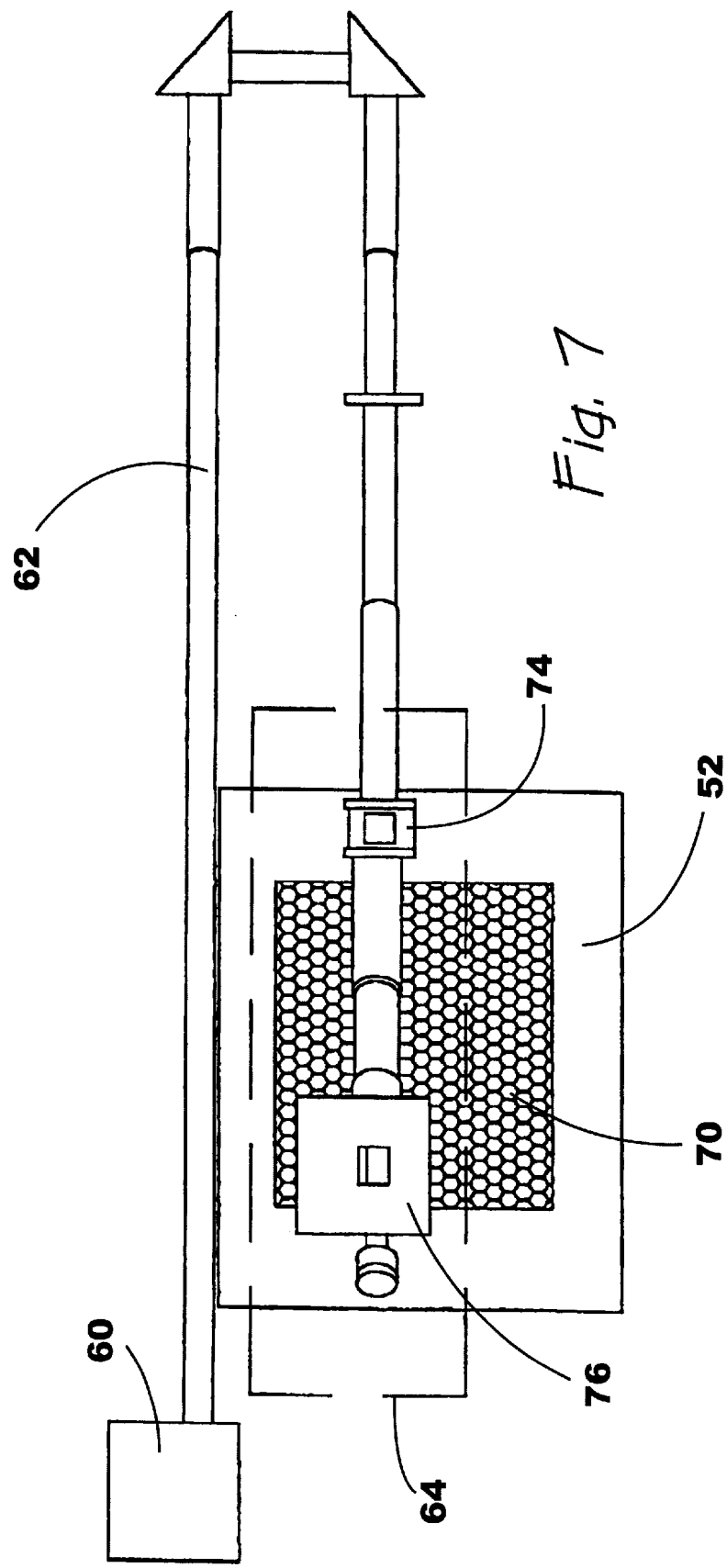

METHOD OF BONDING A LAYER OF MATERIAL TO A SUBSTRATE

TECHNICAL FIELD

The present invention relates generally to laser cutting and welding systems and more particularly to methods of bonding materials together using a laser, and in particular as those methods relate to the production social expression products such as of greeting cards.

BACKGROUND

Multi-layered products, known as composites, typically have a substrate and at least one layer of material bonded to the substrate. Composites are used for a variety of purposes and in a variety of industries. Social expression products such as gift wrap, stationary, knick knacks, calendars and greeting card often have decorative lettering or designs bonded to substrate. In the case of greeting cards, the substrate is typically a paper card stock. Currently, the process for creating composites requires applying adhesive to the layer of material and applying physical pressure and heat to activate the adhesive to bond the layer to the substrate.

The application of a layer of shiny script to a greeting card substrate, for example, involves the use of two metal plates or "dies," in which one die has a positive image of the script engraved on it and the other a negative image. The card substrate is then placed flatly between the dies. A sheet of film, also known as a "carrier," having a layer of aluminum foil attached to it on one side and a layer of adhesive applied to the aluminum foil, is then placed on the substrate. Under intense heat and pressure, the sheet of film and the substrate are crushed together between the dies, thereby activating the adhesive and imprinting the aluminum foil onto the card substrate in the pattern of the script. The film carrier is then removed from the substrate, leaving only the aluminum foil script bonded to the substrate.

Traditional heat/pressure-based methods for creating composites have several disadvantages that are apparent from the greeting card process described above. First, the creation of the positive and negative dies is very time consuming and labor intensive. Second, because the top layer of material and the substrate are crushed together, the aluminum is forced to assume the texture of the card, making the process very stock sensitive. Finally, the resulting script or image has a ragged look around the edges, which may not be the aesthetic effect desired. Thus, it can be seen that there is a need for an improved method of bonding a layer of material to a substrate such as to bond foil to a greeting card.

SUMMARY OF THE INVENTION

In accordance with this need, a method of bonding a layer to a substrate is provided. According to one embodiment of the method, the layer is placed on the substrate and a laser beam is directed onto the layer to activate an adhesive disposed between the layer and the substrate to bond the layer to the substrate. An excess portion of the layer being lased may be cut away while the trace profile is being traced by the laser beam.

The layer may be placed on the substrate without adhesive, and a laser beam may be directed onto the layer in a closed path to bond the layer to the substrate and cause the layer to puff away from the substrate within the closed path. Alternatively, the substrate may be placed on the layer, and a laser beam directed onto the substrate to activate an adhesive disposed between the layer and the substrate to bond the layer to the substrate.

The laser beam may be moved along a path represented by a trace profile. The trace profile may be comprised of a plurality of vectors defining a path on the layer. Commands within the trace profile may be grouped according to the portion of the path they represent. Beam profiles may be used to configure the beam, and a trace profile may use one or more beam profiles to create an image. The commands within the trace profile may be grouped according to the beam profiles being used.

The laser beam may be moved along a closed path to puff the layer away from the substrate within the closed path. Moving the laser beam repeatedly over the closed path may further puff the layer away from the substrate within the closed path. A portion of the layer outside of the closed path may be lased to bond the layer to the substrate such that the outside portion is flatter than the portion of the layer inside the closed path.

The heat of the laser beam may be controlled to (1) increase or decrease the thickness of a bonded region along which the layer and the substrate are bonded, and (2) to change the color of the layer. The pulse width of the laser beam may be changed to increase or decrease the distance between successive portions of a bonded region along which the layer and the substrate are bonded.

A composite is also provided in accordance with the foregoing needs. The composite is comprised of a substrate, a layer bonded to the substrate along a closed path, and a material disposed between the layer and the substrate within the closed path. The material puffs the layer away from the substrate in response to a laser beam. The material may be a gas or vapor released from the layer, or the substrate.

The layer may be bonded to the substrate with an adhesive, and the material may be a gas or vapor released from the adhesive. The layer may be also melted to the substrate along the enclosed path without an adhesive. The substrate may be comprised of many different materials, including, but not limited to polyester, vinyl, polystyrene, ethylene vinyl acetate, polypropylene, aluminum, cloth, wood, veneer, plastic, leather, glass, paper, parchment, textured stock, vellum, textiles, a film carrier having an aluminum deposit or any combination thereof.

A method of bonding a layer of thermoplastic material to a paper substrate is also provided in accordance with the foregoing needs. According to the method the thermoplastic layer is placed on the substrate, and the laser beam is directed onto it to melt a local area of the thermoplastic, thereby bonding the layer to the paper substrate.

A method of decorating a greeting card is also provided in accordance with the foregoing needs. According to the method, a layer of decorative material is placed on a greeting card stock, and a laser beam is directed onto the layer to activate an adhesive disposed between the layer and the card stock to bond the layer to the greeting card stock.

BRIEF DESCRIPTION OF THE DRAWINGS

While the appended claims set forth the features of the present invention with particularity, the invention may best be understood from the following description of the preferred embodiment taken in conjunction with the following drawings of which:

FIG. 6b is a close-up view of the target table of the laser system of FIG. 6a;

FIG. 7 is a top view of the laser system of FIG. 6a; and

DETAILED DESCRIPTION OF THE INVENTION

Figure 1:
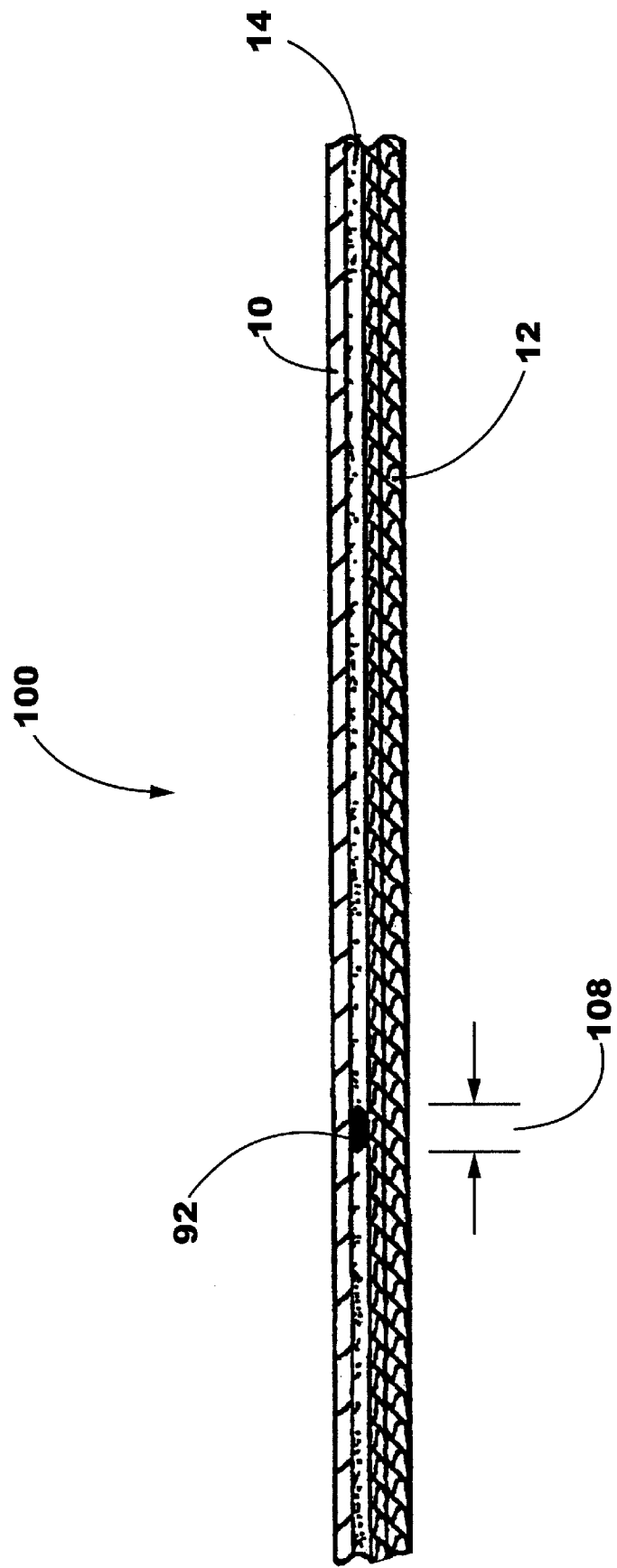
FIG. 1 is a cross-sectional view of a composite formed in accordance with the present invention.

Referring to FIG. 1, the present invention is generally directed to a method and system for bonding a layer of material to a substrate using a laser beam. In accordance with the preferred embodiment of the invention, a top layer 10 of material such as a foil is placed on a substrate 12 such as paper stock over a layer of adhesive 14 to form a composite 100 as shown. The top layer 10 is then struck with a laser beam which activates the adhesive 14, such as by melting or softening it, in the area around which the beam strikes, causing the adhesive 14 to bond the top layer 10 to the substrate 12 to form a bonded region 92. Alternatively, the composite may be positioned so that the substrate 12 is on top and the top layer 10 is on the bottom. The substrate 12 could then be struck with the laser and the heat would be transmitted through the substrate 12 to activate the adhesive 14.

Figure 2:
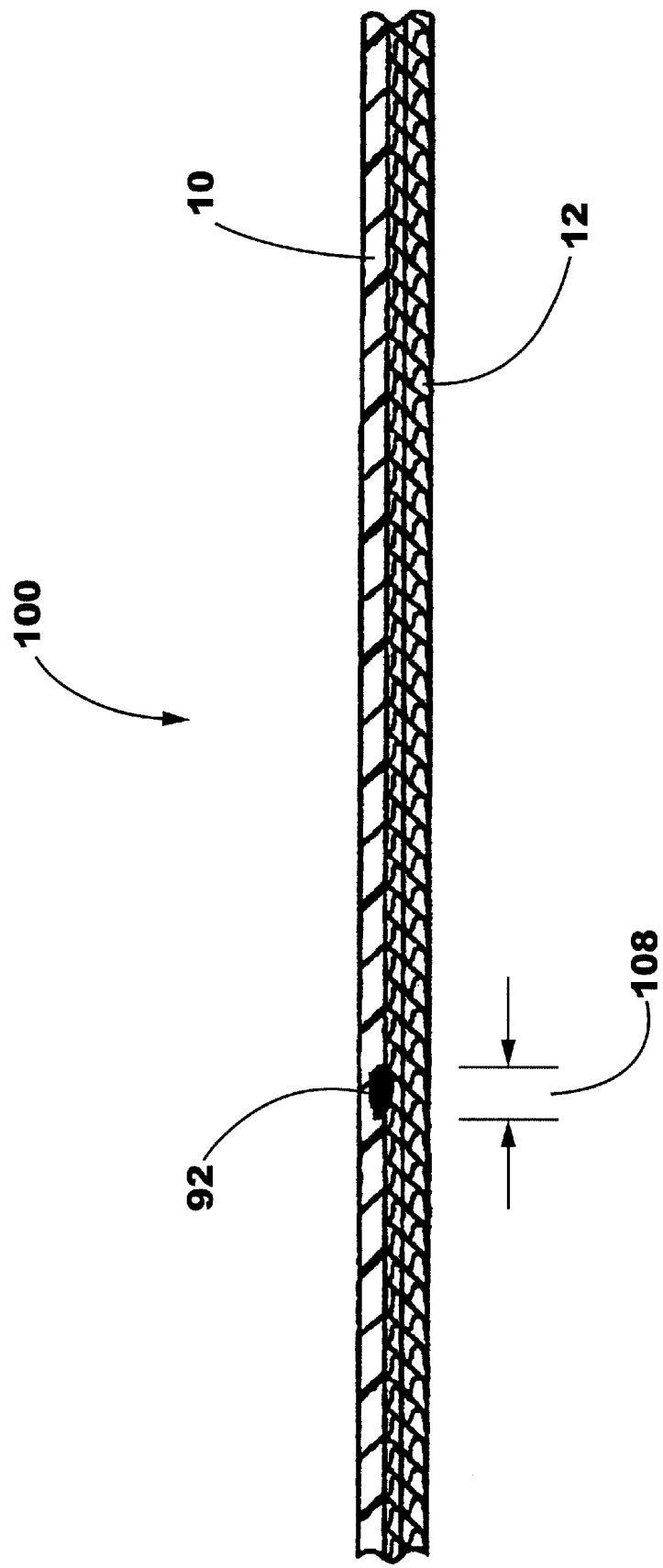
FIG. 2 is a cross-sectional view of a composite formed in accordance with an alternative embodiment of the present invention.

According to another embodiment of the invention, the top layer 10 of the composite 100 is in direct contact with the substrate 12, as shown in FIG. 2. In this embodiment, the heat from the laser beam causes either the top layer 10 or the substrate 12, or both to become tacky and bond the top layer 10 and the substrate 12 to create the bonded region 92 without an adhesive. For example, one of the layers may be a thermoplastic material.

Figure 3:
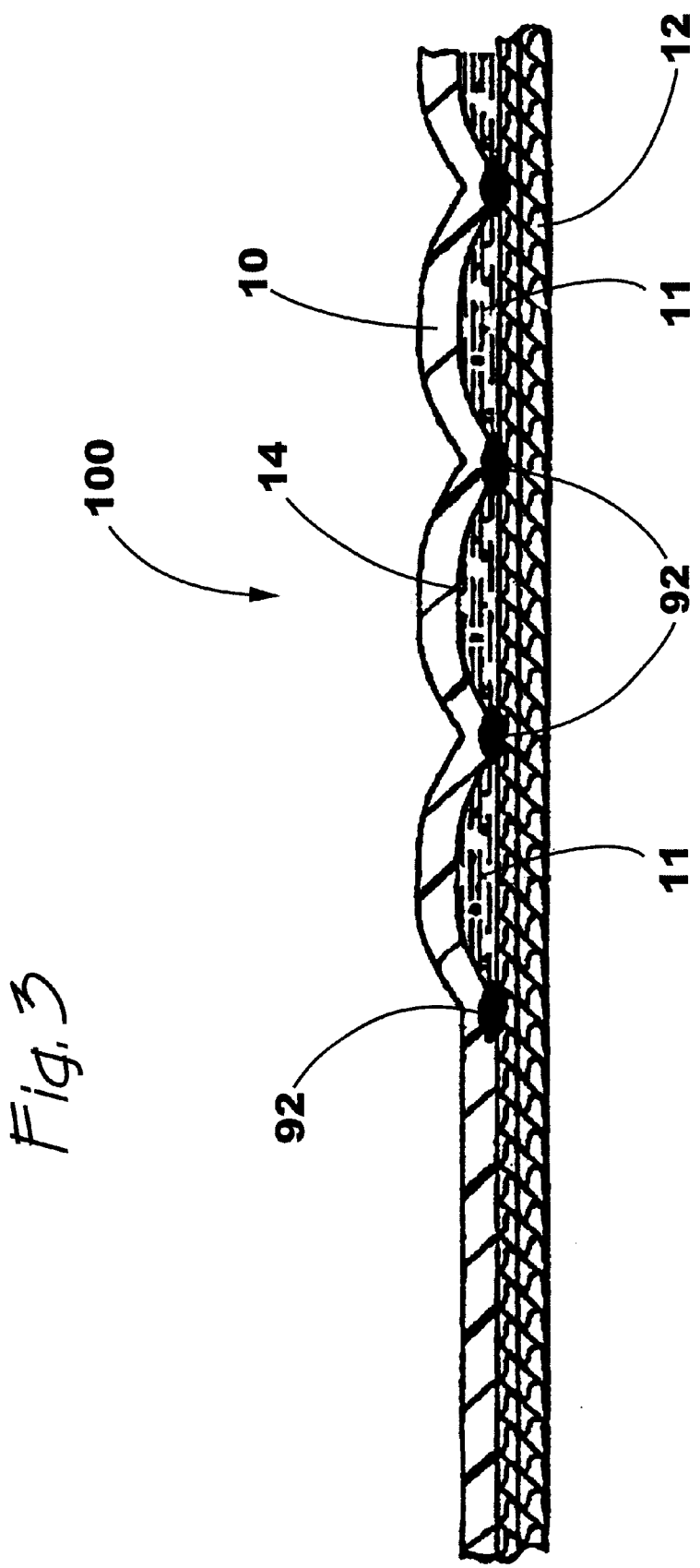
FIG. 3 is a cross-sectional view of a composite in which a layer is puffed away from the substrate in accordance with an aspect of the present invention.

Referring to FIG. 3, the heat generated by the laser beam may release a gas or vapor 11 from either the substrate 12, the adhesive 14 (if used), the top layer 10 or a combination thereof. By lasing the composite 100 along a closed path, this gas or vapor 11 may be trapped beneath the top layer 10, causing the top layer 10 to puff away from the substrate 12. Micro-encapsulated butane, such as that found in PUFF-PRINT manufactured by J & S PUFF STUFF, may also be included in the adhesive 14 to enhance the puffiness. The resulting puffiness gives the finished product a three-dimensional look and feel.

Incorporating a non-porous material into the top layer 10 may increase the 10 degree to which the top layer 10 puffs. For example, where the method is used to attach an aluminum foil to a greeting card stock to create decorative lettering or designs, the film on which the aluminum foil is carried may be bonded to the card substrate along with the foil, thereby providing a non-porous barrier that traps the gas or vapor.

Figure 4:
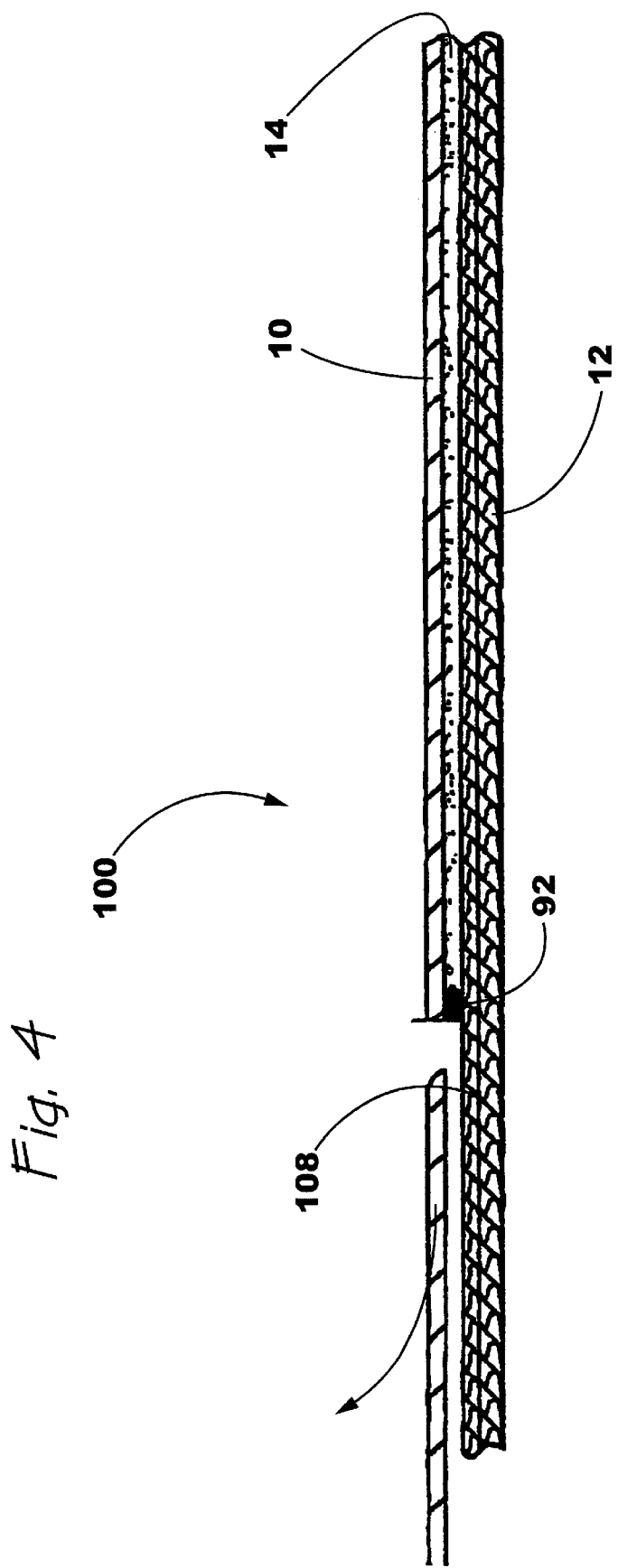
FIG. 4 is a cross-sectional view of a composite in which an excess portion of the layer is cut away in accordance with an aspect of the present invention.

Referring to FIG. 4, the heat generated by the laser beam may simultaneously cut away an excess portion 10a of the top layer 10 and bond the top layer 10 to the substrate 12 by creating a bonded region 92 at the same time. This allows the excess portion 10a to be pulled away from the composite 100 once the bonding process is complete.

Referring to FIGS. 1–4, the top layer 10 of the composite 100 may be any number of materials, including, but not limited to, polyester, vinyl, polystyrene, ethylene vinyl acetate, polypropylene, aluminum, cloth, wood, veneer, plastic, leather, glass, paper, parchment, textured stock, vellum, textiles, a film carrier having an aluminum deposit or any combination thereof. To attach the top layer 10 to the substrate 12 without an adhesive as shown in FIG. 2, the top layer 10 is preferably a thermoplastic material including, but not limited to polyester, vinyl, polystyrene, polypropylene or ethylene vinyl acetate. Where the top layer 10 is a foil attached to a film carrier for creating decorative lettering or designs on a greeting card, the thickness of the top layer 10 is preferably from about 0.0002 inches to about 0.020 inches and may vary depending on the materials used, the strength of the laser, and the type of bond desired.

Referring to FIGS. 1, 3–4, the adhesive 14 may be any suitable adhesive including a thermoplastic material such as ethylene vinyl acetate, or polyamide. Other suitable adhesives include polyvinyl acetate emulsions, polyvinyl acetate dextrin hybrid systems, wax and acrylics. Since the heat from the laser beam 16 may also release moisture from the top layer 10 or the substrate 12, moisture activated materials such as envelope adhesives, resin, or dextrin are also suitable.

The adhesive 14 can be of any suitable thickness, but when used to attach aluminum carried on a film to a greeting card stock substrate to create decorative lettering or designs, the adhesive used is preferably applied in a thickness of about 0.0001 inches to about 0.003 inches. Suitable adhesives include acrylic and ethylene vinyle acetate such as AIRFLEX 300 and AIRFLEX 400 manufactured by AIR PRODUCTS.

The substrate 12 may also be comprised of a wide range of materials, including polyester, vinyl, polystyrene, ethylene vinyl acetate, polypropylene, aluminum, cloth, wood, veneer, plastic, leather, glass, paper, parchment, textured stock, vellum, textiles, a film carrier having an aluminum deposit or any combination thereof, and may be of any suitable thickness. Where the substrate 12 is a greeting card stock, its thickness is preferably from about 0.002 inches to about 0.020 inches. Since the present method and system does not require forcing the top layer 10 onto the substrate 12 as do conventional techniques, the substrate 12 may also have a wide variety of textures. For example, if the texture of the substrate 12 is rough, and the adhesive 14 is sufficiently thick the adhesive 14, once activated, may flow into and fill the depressions on the surface of the substrate 12, thus enabling the top layer 10 to maintain its original texture. Alternatively, the top layer 10 may if sufficiently conformable, be placed on the substrate 12 so that it flexes to fill in the depressions of the substrate 12 in order to give the top layer 10 a textured appearance.

Figure 5:
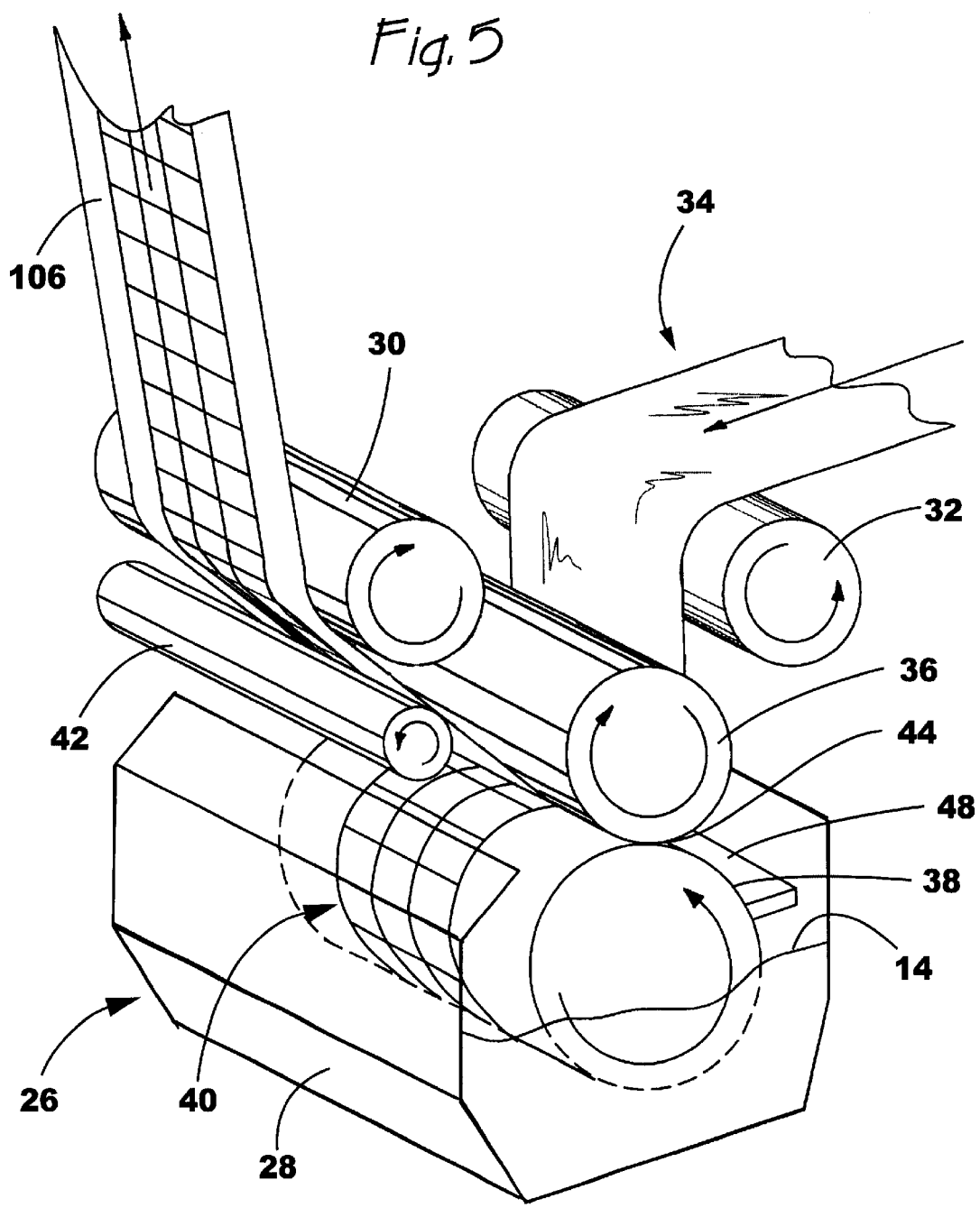
FIG. 5 is a perspective view of a gravure process that may be used to apply adhesive in accordance with the present invention.

The adhesive 14 shown in FIGS. 1, 3–4 may be applied to either the top layer 10 or the substrate 12 using a conventional process, such as the gravure process 26 illustrated in FIG. 5. To apply the adhesive 14, the top layer 10 or the substrate 12 enters the gravure process 26 as a web 34. The gravure process 26 includes a pan 28 for holding the adhesive 14 in a liquid form, idler rollers 30 and 32 for supporting the web 34, a smoothing bar 42, a doctor blade 48, an engraved cylinder 38 that is at least partially immersed in the adhesive 14, and an impression cylinder 36 that forms a nip 44 with the engraved cylinder 38. The engraved cylinder 38 has one or more depressions or cells 40 engraved on its surface for holding an amount of the adhesive. As is conventional, the amount of adhesive applied to the surface of the web 34 can be varied by changing the depth of the cells 40.

As the gravure process 26 operates, the engraved cylinder 38 rotates in the pan 28 and the adhesive 14 is collected in the cells 40. The doctor blade 48 removes excess adhesive from the non-engraved portions of the cylinder 38. The web 34 passes through the nip 44, where the impression cylinder 36 presses the web 34 onto the engraved cylinder 38, causing the adhesive 14 to be transferred from the cells 40 to the web 34 in a pattern corresponding to the cells 40. Preferably, at least a portion of the surface 106 is not covered with adhesive to provide an area for holding the web 34. As the web 34 exits the gravure process, the smoothing bar 42 may be used to smooth the adhesive 14 onto the surface of the web 34 if full coverage is required. Other suitable gravure processes include reverse gravure and offset gravure. The adhesive 14 may also be applied using non-gravure methods, such as inkjet, direct roll coat, reverse roll coat, air knife, spraying or rolling the adhesive onto the web 34 with a metal rod wrapped in wire. If the adhesive 14 is a hot-melt adhesive, a hot-melt gun or suitable spray system may be used to apply the adhesive 14. To make the web 34 easier to handle after it has passed through the gravure process, the adhesive 14 is preferably dried on the web 34 before it is cut and combined with the remaining components of the composite 100.

Figure 6A:
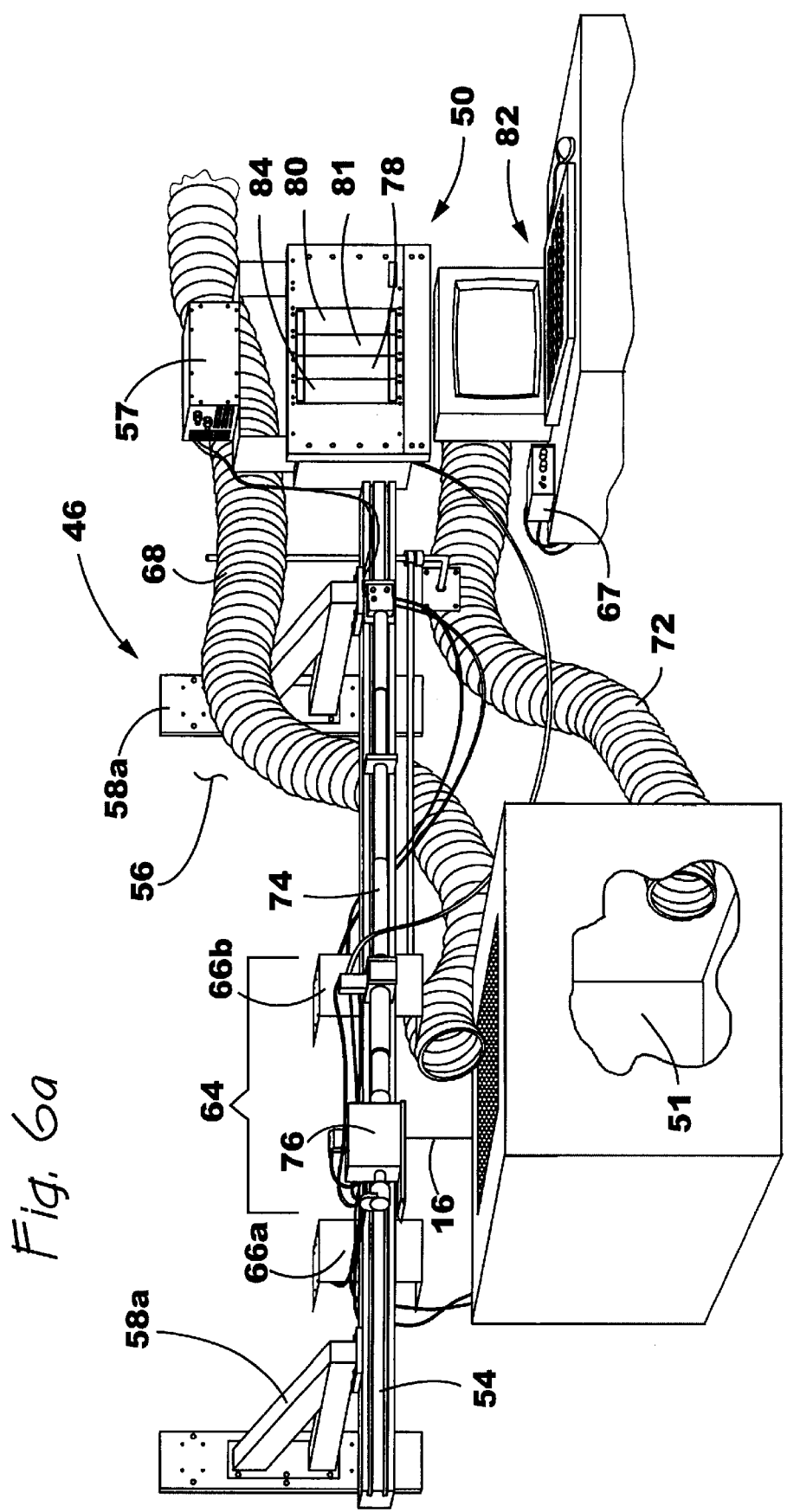
FIG. 6a is a perspective view of a laser system that may be used to practice the present invention.
Figure 6B:
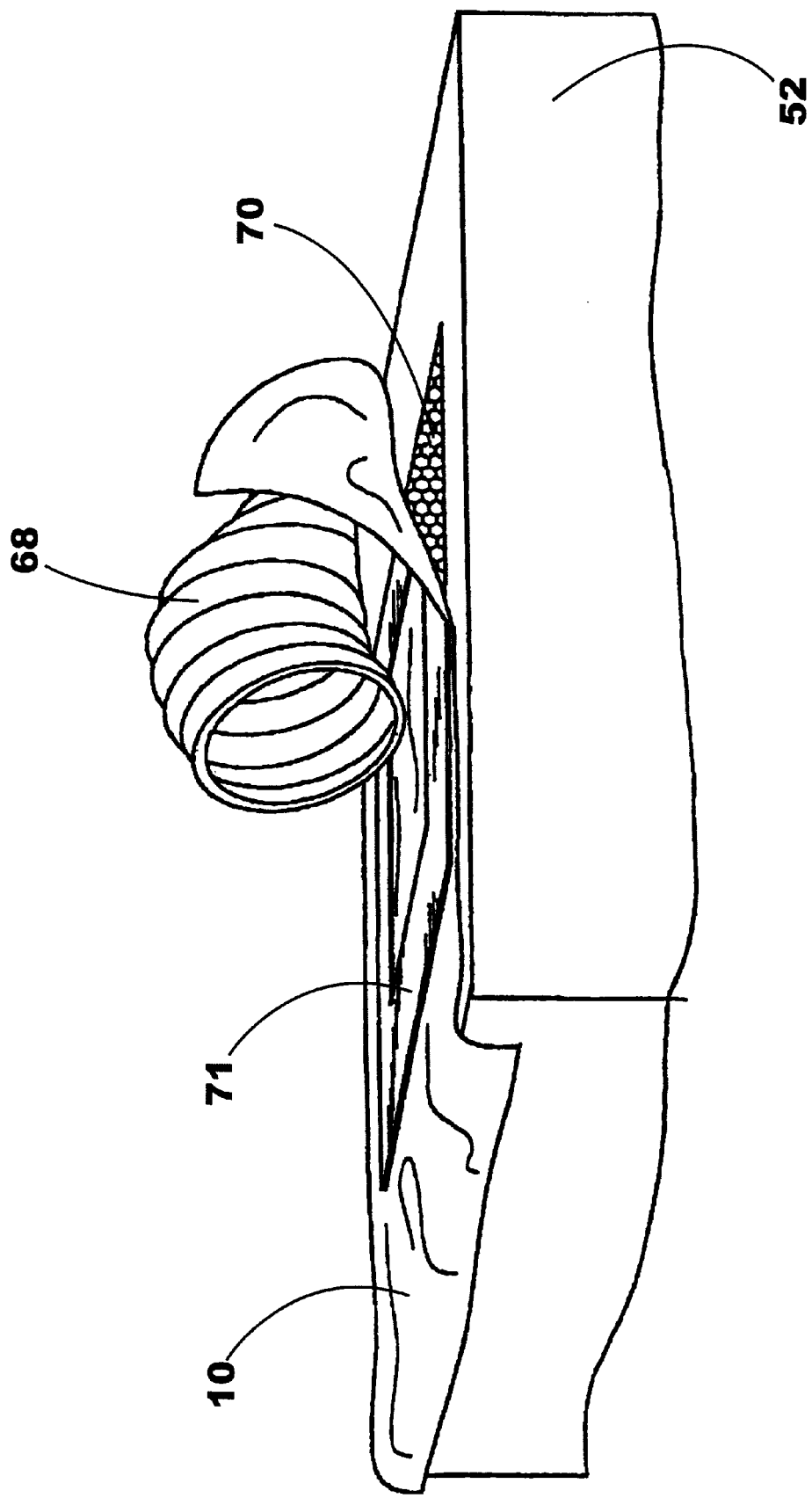

Referring to FIGS. 3, 6a, 6b and 7, a laser system 46 which may be used to attach a layer of material to a substrate in accordance with the invention is shown. The laser system 46 includes a control station 50, and a target table 52. The target table 52 has a support structure 70 for supporting the substrate 12 and the target 10 over an enclosure 51. The support structure 70 may be of a variety of materials but a honeycombed layer as shown in FIGS. 6a, 6b and 7 is known to be suitable. A vacuum fan (not shown) draws air through a vacuum tube 72 which communicates with the enclosure 51 and through the support structure 70 to hold the substrate 12 firmly to the support structure 70. The negative pressure created in the enclosure 51 may assist in retaining the top layer 10. To reduce the puffiness of the top layer 10 (FIG. 3) that may result from the release of the gas or vapor 11, the force of the vacuum being created by the vacuum tube 72 may be increased. A mask 71 may also be placed upon the top layer 10 of the composite 100 to provide additional pressure thereon while leaving the target area exposed.

The laser system 46 also includes a support rail 54 mounted to a vertical surface 56 by a pair of braces 58a–58b. The support rail 54 supports a light passage tube 62, a light source 60, a pair of cooling fans 66a and 66b and a three-axis galvanometer 64. The three-axis galvanometer 64 has a scan head may be of a variety of sizes, depending on the size of the composite being produced, but a 30 mm scan head is known to be suitable. The light source 60 may be of a variety of types and strengths, but a 10.600 nanometer, 25 watt, CO2 laser light source is known to be suitable. The light passage tube 62 provides an enclosed path from the light source 60 to the three-axis galvanometer 64. A power supply 57 is coupled to the light source 60 for providing electricity thereto. The cooling fans 66a and 66b dissipate heat generated by the laser system 46. An exhaust fan (not shown) draws fumes and excess particles up an exhaust tube 68 and safely away from the operator. A manual control unit 67 is also coupled to the light source 60 as well as to the power supply 57 and allows an operator to manually adjust the amount of electricity flowing from the power supply 57 to the light source 60 and thereby control the pulse amplitude of the beam. Suitable control units include a HEWLETT PACKARD HP8904A function synthesizer, a COHERENT LC-C520 laser control, a SYNRAD UC-1000 laser controller, and a HEWLETT PACKARD HP33120A Arbitrary Waveform Generator. If the light source 60 is a pulsed source, such as a CO2 laser, then the manual control unit 67 may also be used to adjust the pulse width of the laser beam 16.

Although the depicted laser system is known to be suitable, other laser systems, such as an X-4 laser may be used. During operation of the laser system 46, the light source 60 transmits the laser beam 16 into the light passage tube 62. A set of well-known optics (not shown) within the light passage tube 62 reflects the laser beam 16 to the galvanometer 64. The galvanometer 64 directs the beam 16 downward onto the top layer 10. As is conventional, the galvanometer 64 has a z-axis unit 74 which moves a z-mirror (not shown) laterally to control the depth of the focal point of the laser beam 16, and an x-y unit 76 which moves a set of x and y mirrors (not shown) to control the motion of the laser beam 16 along the top layer 10 of the composite 100. An x-controller 78 and a y-controller 80 are communicatively linked to the x-y unit 76 to control the operation of the x-y unit 76. A z-controller 81 is communicatively linked to the z-axis unit 74 to control its operation.

Referring to FIGS. 6a and 7, the galvanometer 64 responds to the control signals generated by the x-controller 78, the y-controller 80 and the z-controller 81 by directing the laser beam 16 along the top layer 10 of the composite 100. These control signals are generated based on parameters transmitted remotely in a data string or entered by an operator at a computer 82 which is communicatively linked to the controllers 78, 80 and 81 via an interface unit 84 connected to a bus (not shown) over which the computer 82 communicates. The computer 82 may be a variety of devices, including a laptop computer, handheld unit, mini-computer or mainframe but is depicted in FIG. 6a as a conventional personal computer.

In accordance with the preferred embodiment of the invention, the parameters entered at the computer 82 include a trace profile, which represents the pattern that is to traced on the top layer composite 100, and one or more beam profiles, which represent the speed at which the galvanometer 64 directs the beam 16 over the design as well as the level of detail with which designed is traced. Each trace profile may have multiple beam profiles associated with it. This allows different portions of the pattern to be lased at different speeds and with different levels of detail.

There are many suitable methods for creating the trace profile. According to the preferred embodiment, a piece of artwork having the pattern is scanned by a conventional scanner using and stored on a computer (not shown) as a bitmap file. The outlines of the image are extracted from the image and converted from raster format to vector format using a graphics paragraph such as "VPHyrideCAD" by SOFTLEC; "Scan2CAD" by SOFTCOVER INTERNATIONAL LIMITED; "TracTrix" by TRACK SYSTEM; "Streamline" by ADOBE; "Tracer for AutoCAD" by INFORMATION & GRAPHICS SYSTEM, INC.; "FlexiS-CAN" by AMIABLE TECHNOLOGIES INC. and saved in a standard format, such as a MACINTOSH *.ART file. The image may then be edited to eliminate imperfections created during the scanning process.

The image may also be generated from scratch using one or more commercially available software packages, such as "Photoshop" by ADOBE, AUTOCAD or "Coreldraw" by COREL, thus eliminating the need for scanning a piece of artwork.

Using a conventional graphics program, the digital image may then be edited to remove the features that are not required to be lased and to remove extraneous features created during the scanning process. The digital image is then converted into a series of commands that can be interpreted by the controllers 78, 80 and 81 to generate the control signals necessary to cause the x-y unit 76 and the z-unit 74 to move their respective mirrors to direct the beam 16 along one or more paths on the surface of the top layer 10. In the preferred embodiment of the invention, the controllers 78, 80 and 81 use a vector-based command language such as HEWLETT-PACKARD GRAPHICS LANGUAGE (HPGL). There are many commercial software packages that are capable of converting from a raster-based image to a vector-based language, including ADOBE PHOTOSHOP and AUTOCAD *.PLT AUTOCAD by AUTODESK. Other languages that may be used by the controllers 78, 80 and 81 include AUTOCAD *.DXF, MACINTOSH COMMON LISP by APPLE, the C programming language, or a proprietary job control language provided by the laser system manufacturer.

As is conventional, a vector-based command language such as HPGL defines a set of plotting commands such as PU (Pen Up), PD (Pen Down), and PA x units y units (move pen to absolute coordinates x,y). If HPGL is used, the controllers 78, 80 and 81 interpret the commands as laser control commands. For example PU is interpreted as "beam off," PD as "beam on," and PA as a beam movement command. SP (select pen) is interpreted by the controller as a command to change the beam profile within the software control of the computer 82.

To ensure that the process moves as efficiently as possible, the commands provided to the controllers 78, 80 and 81 are preferably arranged so as to minimize the movement of the beam 16 over the top layer 10. Grouping the commands by the beam profile also speeds up the process, since each beam profile change may require recalibration of the galvanometer by the controllers in some laser systems. For example, all of the commands that are performed using beam profile number 1 ("pen number 1" in HPGL lexicon) may be performed in a continuous series, the commands using beam profile number 2 may then be grouped together, etc. The commands may also be rearranged to minimize the interference created by so-called "fly-up," in which particles cut away from the surface of the top layer 10 fly up into the path of the beam 16. The commands may be rearranged using many tools, including a text editor, a word processing macro, or by a software routine written for that purpose.

Figure 8:
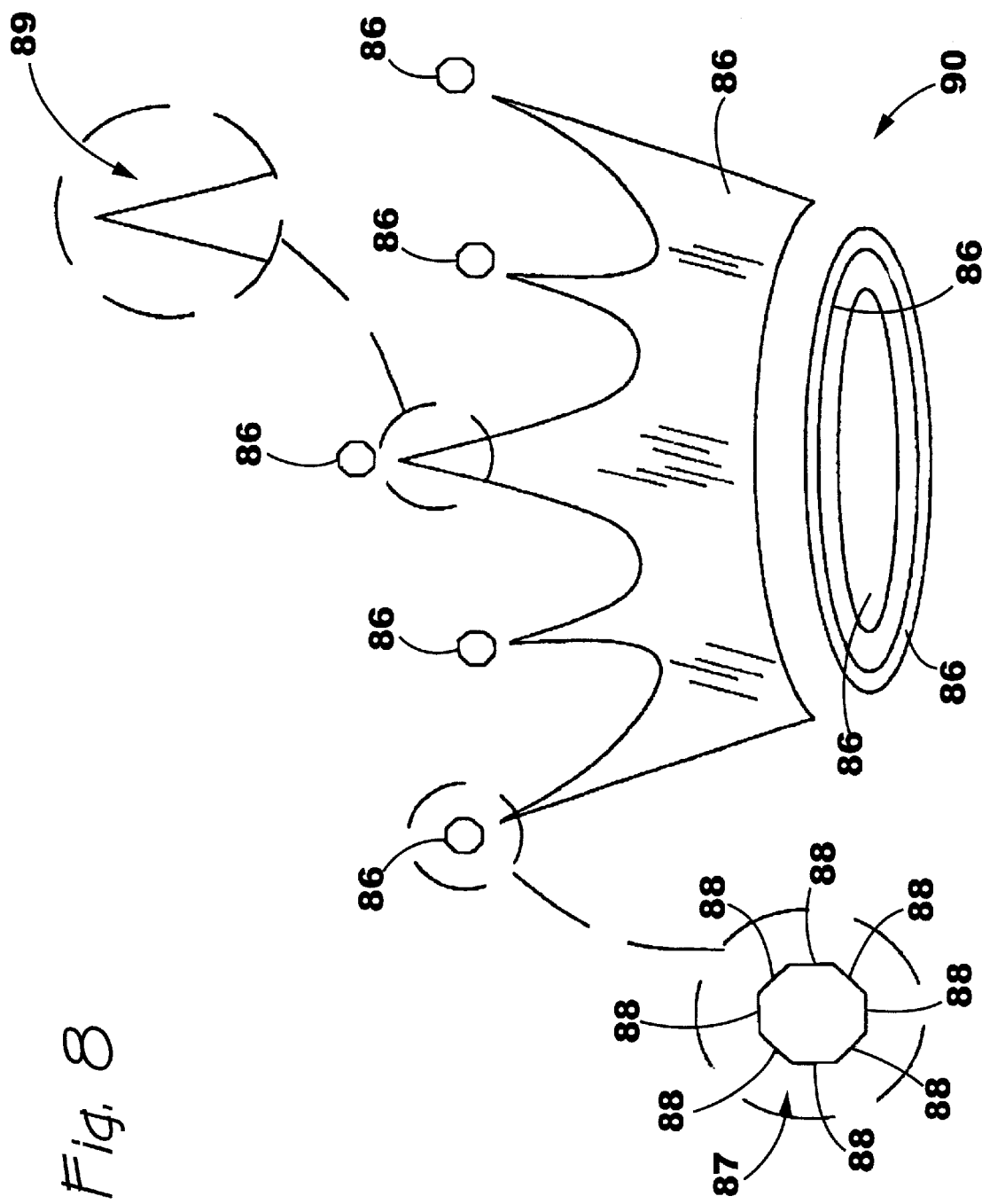
FIG. 8 is a top view of a HALLMARK logo created in accordance with an example use of the present invention.

Referring to FIGS. 4 and 8, the invention may be used to laser a pattern, such as the exemplary HALLMARK logo pattern 90, on the top layer 10, and to cut away the excess portion 10a to create a decorative design on a greeting card. The pattern may be a positive image defined by the outline of the top layer 10, such as the pattern 90, a negative image defined by the substrate 12 or any combination of the two. The pattern may also represent portions of the top layer 10 that are partially lased off in order to etch images onto the greeting card. Furthermore, the pattern may be comprised of a variety of sub-patterns, including continuous lines, dashed lines, and individual points anchored to the substrate.

To illustrate how the beam profile is created in accordance with the preferred embodiment of the invention, reference is made to the pattern 90 of FIG. 8. To create the beam profile, the pattern is divided into one or more strokes or paths 86. Each path 86 represents a line traced along the surface of the top layer 10 by the laser beam 16. A path 86 may completely surround an area of the top layer 10, in which case it is considered "closed" or it may define a simple curve or line, in which case it is considered "open." The paths 86 shown in FIG. 8 are all closed paths. Each path 86 is further divided into one or more vectors 88, which represent continuous straight-line segments. The level of detail in the design is generally proportional to the number of vectors 88 per path 86.

In accordance with the preferred embodiment of the invention, each beam profile may include such parameters as

| Parameter name | Function |
|---|---|
| 1) step size | the length of a vector; |
| 2) jumpsize | the distance between consecutively lased strokes; |
| 3) step period | the length of time it takes to complete the lasing of a vector; |
| 4) mark delay | the amount of time the beam is kept on the surface of the top layer 10 at the end of a vector before the beam is moved to the next vector; |
| 5) jump delay | the amount of time the beam is turned off while the laser moves from one path to another; |
| 6) stroke delay | the amount of time the laser beam is turned off between successive strokes; |
| 7) laser-on delay | the period of time between the laser being pointed at the beginning of a stroke on the top layer 10 and the beam being applied to the target; |
| 8) laser-off delay | the period of time between reaching the end of a stroke on the top layer 10 and disengaging the beam; |
| 9) lamp-current delay | the period of time between a voltage being applied to the laser 48 and a current being passed through the source of the laser; |
| 10) lamp current | the level of current to be applied to the light source 60; |
| 11) pulse width | the duration of each laser pulse; |
| 12) break angle | the angle between two adjacent vectors within a single stroke; |
| 13) auto-segmentation | an automated optimization of a beam path; |
| 14) dither width | eccentricity of the beam along the x-axis; |
| 15) dither feed | eccentricity of the beam along the y-axis; |
| 16) pulse frequency | the frequency of the laser pulses; |
| 17) scan speed | the relationship between the step size and the step period; |

Referring to FIGS. 1–4 and 8, the heat from the laser beam 16 as it traces the pattern 90 creates a bond 92 between the substrate 12 and the top layer 10. As previously described, the bond 92 may result from either the activation of an adhesive 14 which is disposed between the top layer 10 and the substrate 12 (FIGS. 1, 3–4) or, if no adhesive is used (FIG. 2), from the melting of the top layer 10, the substrate 12 or a combination of the two.

To increase the effective energy of the laser beam 16 (FIGS. 6a and 6b), making one or more of the following changes to the beam profile at the computer 82 is known to be effective: increasing the "mark delay" parameter to decrease the rate at which the laser beam 16 moves along each vector; increasing the "lamp current" to increasing the output of the beam 16; and adjusting the "pulse width" parameter (if a pulsed laser is being used). To decrease the effective energy of the beam 16, the opposite changes may be made to the beam profile. The beam output and the beam pulse width may also be increased or decreased manually by using the manual controls 67.

The effective energy of the beam 16 may also be increased or decreased by adjusting the beam's focal point along the z-axis. This can be accomplished by changing the height of the table 52, or by moving the optics of the laser closer to or farther away from the table.

Increasing and decreasing the effective energy of the laser beam 16 increases and decreases the temperature of the top layer 10, the adhesive 14 (if used), and the substrate 12 in the area struck by the laser beam 16. Preferably, the heat of the laser beam 16 is sufficient to cut and/or bond the top layer 10 but insufficient to cause damage or unwanted discoloration to the top layer 10 or the substrate 12. Where an adhesive is used, the temperature should at least reach the adhesive's softening point. For example, to bond and cut a layer of aluminum foil on a polyester carrier to a greeting card stock substrate using an ethylene vinyl acetate adhesive, the temperature of the laser-struck area will preferably be between 200 and 500 F., which is hot enough to soften the adhesive and cut away the excess polyester carrier and aluminum foil without discoloring the greeting card or the decorative lettering or design.

The effective diameter of the beam 16 may be increased to increase the width 108 of the bond 92. This may be desirable to give the edges of the pattern 90 a softer appearance. Similarly, increasing the effective energy of the beam 16 may also darken the color of the top layer 10 or increase the degree to which the top layer 10 puffs away from the substrate 12. The beam 16 may also be repeatedly applied over a closed path, to increase the amount of steam or other hot gases released and thereby increase the amount of puffiness.

Different areas of the top layer 10 may be subjected to different levels of heat from the laser beam 16 in order to create certain effects. For example, it may be desirable to have certain portions of the top layer 10 be puffy while other portions remain flat in order to create a quilted look. To enhance this effect, the outlines of the puffed portions could be subjected to higher levels of heat, greater effective beam diameters, and/or more passes than the outlines of the flat portions.

The geometry of the bond 92 may also depend on the cross-section of laser beam 16. For example, a beam having a Gaussian cross-section will tend to concentrate energy in the center, while a top hat beam will result in a more uniform distribution of energy. Thus, a Gaussian beam will tend create a bond 92 that is narrower than one created using a beam having a top-hat cross-section. A ring beam having multiple peaks may be used create ringed patterns or closely spaced lines. Combinations and variations of these cross sections may be used to create other types of bonds as well.

Referring to FIG. 8, one or more of the paths 86 may be lased in an intermittent manner to give the top layer 10 a "stitched" appearance. More specifically, the pulse width of the beam 16 may be increased or decreased in order to increase or decrease the distance between parts of the bond 92 along a vector 88. Thus, the degree to which the top layer 10 has a stitched appearance is proportional to the pulse width of the beam 16.

In the preferred embodiment of the invention, the pulse width and power of the laser beam 16 may be manually adjusted in response to an undesirable condition. For example, if an operator sees discoloration, burning of the top layer 10 or the substrate 12 or an unwanted stitching pattern, the operator can manually adjust the power and/or the effective pulse width of the laser beam 16 using the manual control unit 67 or appropriate combination of parameters at the computer 82. The operator may also lower the table 52 to increase the distance between the top layer 10 and the galvanometer 64, thereby reducing the effective power of the beam 16.

Operation of the preferred embodiment of the invention can be illustrated and summarized with an example production of a greeting card having a top layer comprising an aluminum foil attached to a polyester carrier, and a substrate comprising a standard greeting card stock such as Carolina Board. For this example, it is assumed that the top layer will be simultaneously cut into the shape of the HALLMARK logo 90 of FIG. 8 and attached to the greeting card stock.

The logo 90 is scanned into digital form and converted into the HPGL*.PLT file shown in Appendix A. As can be seen, the file conversion process may result in extraneous commands, such as a "Pen-Up" (PU) being located back-to-back with a "Pen-Down" command. To ensure that the lasing process operates efficiently, this file may then be parsed to eliminate such extraneous command combinations. The commands may also be rearranged to minimize the movement of the laser, and to reduce the effects of so-called "fly-up." Fly-up occurs when pieces of material from the target are kicked up into the path of the laser beam during the lasing process, thereby reducing the effecting energy of the beam.

The gravure process of FIG. 5 is loaded with an engraved cylinder 38 having cells 40 that encompass an area of approximately the size of the HALLMARK logo. The top layer 10 is provided in the form of a continuous sheet on a web 34 of aluminum foil attached to a polyester carrier. To avoid wasting adhesive and to ease the handling of the polyester-aluminum web 34, the cells 40 are preferably designed to limit the application of the adhesive 14 to those portions of the top web 34 that will actually be lased—i.e, the paths 86 of FIG. 8. The web 34 is fed into the gravure process over the idler roller 32 and under the impression cylinder 36. As the engraved cylinder 38 rotates within the pan 28, the adhesive 14 gets deposited in the cells 40. This adhesive then gets transferred to the surface 106 of the web 34 as the web 34 passes through the nip 44. The adhesive 14 may then be smoothed by the smoothing bar 42 if solid coverage is desired. The web 34 then exits the gravure process 26 under the idler roller 30.

The greeting card stock substrate 12 is placed on the support structure 70 (FIGS. 6a and 6b) either in sheet form or using an appropriate web feed system (not shown) and the combined polyester-aluminum top layer 10 is placed on top of the substrate 12 with the surface 106 in contact with the substrate 12 so that the portion of the top layer 10 being lased lines up with the projected path of the beam. The mask 71 is placed on the top layer 10 if desired, leaving the target area exposed. The vacuum fan is activated to create a negative pressure in the enclosure 51. The exhaust fan is also activated so that air is drawn up the exhaust tube 68.

One or more beam profiles are chosen and entered into the laser system 46 at the computer 82. While there are a variety of beam profiles possible, the following profile is known to be suitable for creating the HALLMARK logo 90 of FIG. 8 and for minimizing the effects of fly-up:

| Parameter | Setting |
| --- | --- |
| Step Size | 5 units |
| Sump Size | 5 units |
| Step Period | 50 usec |
| Mark Delay | 100 usec |
| Jump Delay | 3000 usec |
| Stroke Delay | 3000 usec |
| Laser On Delay | 1000 usec |
| Laser Off Delay | 1450 usec |
| Lamp Current Delay | 1 usec |
| Pulsewidth | 25 usec |
| Break Angle | 90 |
| Autosegmentation | Checked |
| Dither Width | 0 |
| Dither Feed | 0 |
| Pulse Frequency | 40 Khz. |
| Scan Speed | 290.71 mm/sec |

When the lasing process is initiated the beam 16 creates a temperature sufficient to soften the adhesive and cut the top layer 10. As the beam traces the pattern 90, the adhesive 14 melts, thereby creating a bond between the top layer 10 and the substrate 12. The heat from the laser beam 16 also releases gas and/or vapor from the adhesive 14, causing the top layer 10 to puff out. The top layer 10 is simultaneously cut into the shape of the pattern 90 of FIG. 8. After the lasing process has been completed, the excess portion of the top layer 10 is removed. The resulting greeting card has a decorative design in the shape of the HALLMARK logo which incorporates the film carrier as well as the aluminum into the pattern 90, unlike previous methods in which the film carrier is removed. This makes design soft to the touch.

It can be seen from the foregoing description that a novel method of bonding a layer of material to a substrate has been provided. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the invention may be used to create a variety of other composites, including ribbon, gift bags, tissue paper, plastic ornaments, gift wrap, and packaging.

Furthermore, the illustrated embodiments can be modified in arrangement and detail without departing from the spirit of the invention. Therefore, the invention as described herein contemplates all such embodiments as may come within the scope of the following claims and equivalents thereof.

APPENDIX A

EXAMPLE HPGL FILE

| | | | | |
| --- | --- | --- | --- | --- |
| PU; | PA633, 3161; | PD; | PA655, 3048; | |
| PA587, 2911; | PA518, 2856; | PA358, 2865; | PA243, 2978; | PA221, 3094; |
| PA289, 3207; | PA358, 3254; | PA564, 3231; | PA633, 3161; | PU; |
| PA518, 2567; | PD; | PA633, 1446; | PA793, 759; | PA976, 370; |
| PA1205, 164; | PA1365, 118; | PA1571, 164; | PA1869, 461; | PA2142, 1034; |
| PA2235, 1285; | PA2258, 1308; | PA2325, 1308; | PA2348, 1148; | PA2302, 347; |
| PA2348, 49; | PA2508, −111; | PA2577, −134; | PA2737, −111; | PA3035, 188; |
| PA3538, 988; | PA3676, 1240; | PA3744, 1263; | PA3767, 1263; | PA3813, 1217; |
| PA3790, 1079; | PA3401, 188; | PA2760, −1460; | PA2693, −1529; | PA2165, −1323; |
| PA1342, −1163; | PA129, −1117; | PA−672, −1187; | PA−1449, −1369; | PA−1794, −1529; |
| PA−1884, −1437; | PA−2708, 667; | PA−2914, 1148; | PA−2914, 1240; | PA−2891, 1263: |
| PA−2824, 1263; | PA−2229, 301; | PA−1977, 5; | PA−1794, −134; | PA−1611, −111; |
| PA−1449, 72 | PA−1426, 690; | PA−1473, 1263; | PA−1449, 1285; | PA−1449, 1308; |
| PA−1359, 1308; | PA−1084, 667; | PA−947, 417; | PA−718, 188; | PA−558, 188; |
| PA−329, 164; | PA−54, 440; | PA106, 805; | PA289, 1743; | |
| PA381, 2590; | PA404, 2613; | PA472, 2613; | PA518, 2567; | PU; |
| PA2281, 1926; | PD; | PA2348, 1972; | PA2508, 1972; | PA2623, 1858; |
| PA2646, 1789; | PA2600, 1629; | PA2487, 1560; | PA2325, 1583; | PA2235, 1675; |
| PA2235, 1743; | PA2211, 1766; | PU; | PD; | PA2281, 1926; |
| PU; | PA3767, 1766; | PD; | PA3882, 1881; | PA4088, 1858; |
| PA4179, 1743; | PA4156, 1583; | PA4042, 1469; | PA3859, 1491; | PA3767, 1606; |
| PA3767, 1766; | PU; | PA2417, −1689; | PD; | PA2600, −1872; |
| PA2577, −2055; | PA2417, −2216; | PA2052, −2353; | PA1365, −2467; | PA381, −2536; |
| PA−397, −2490; | PA−1061, −2376; | PA−1473, −2238; | PA−1611, −2147; | PA−1702, −2032; |
| PA−1678, −1826; | PA−1519, −1689; | PA−1153, −1552; | PA−512, −1437; | PA−54, −1392; |
| PA1228, −1414; | PA2029, −1552; | PA2417, −1689; | PU; | PA−1359, 1652; |
| PD; | PA−1473, 1560; | PA−1655, 1583; | PA−1748, 1697; | PA−1725, 1881; |
| PA−1611, 1972; | PA−1426, 1949; | PA−1336, 1835; | PA−1359, 1652; | PU; |
| PA−2868, 1606; | PD; | PA−2983 1491; | PA−3053, 1469; | PA−3189, 1491; |
| PA−3280, 1606; | PA−3259, 1789; | PA−3166, 1881; | PA−2960, 1858; | PA−2868, 1743; |
| PA−2868, 1606; | PU; | PA−8613, −3200; | PD; | PA−8590, −3908; |
| PA−8635, −6243; | PA−8315, −6266; | PA−8201, −6243; | PA−7972, −6312; | PA−7834, −6449; |
| PA−7811, −6632; | PA−7857, −6838; | PA−8063, −7044; | PA−8407, −7203; | PA−8613, −7250; |
| PA−8681, −10408; | PA−8750, −10475; | PA−8887, −10454; | PA−9002, −10269; | PA−9025, −10019; |
| PA−8956, −7319; | PA−9002, −7273; | PA−9986, −7273; | PA−10055, −9218; | PA−10099, −9630; |
| PA−10192, −9630; | PA−10238, −9584; | PA−10261, −7273; | PA−10879, −7226; | PA−12457, −7113; |
| PA−12617, −7067; | PA−12732, −7020; | PA−12800, −6884; | PA−12823, −6768; | PA−12938, −6678; |
| PA−13189, −6632; | PA−13212, −6609; | PA−13212, −6541; | PA−13144, −6495; | PA−12365, −6472; |
| PA−10305, −6357; | PA−10261, −6312; | PA−10192, −4001; | PA−10145, −3908; | PA−10122, −3885; |
| PA−10055, −3885; | | | | |
| PA−9986, −4001; | PA−9963, −4938; | PA−9986, −6220; | PA−9986, −6312; | PA−9574, −6335 |
| PA−9002, −6289; | PA−8956, −6289; | PA−8910, −6197; | PA−8864, −4688; | PA−8773, −3267; |

APPENDIX A-continued

EXAMPLE HPGL FILE

| | | | | |
|---|---|---|---|---|
| PA−8681, −3154; | PA−8613, −3200; | PU; | PA1066, −6655; | PD; |
| PA860, −7386; | PA747, −7615; | PA564, −7777; | PA381, −7821; | PA175, −7777; |
| PA37, −7638; | PA−169, −7044; | PA−283, −6586; | PA−283, −6562; | PA−306, −6541; |
| PA−718, −7296; | PA−947, −7571; | PA−1199, −7754; | PA−1449, −7821; | PA−1817, −7754; |
| PA−2023, −7638; | PA−2206, −7455; | PA−2618, −7708; | PA−2973, −7798; | PA−3189, −7821; |
| PA−3601, −7754; | PA−3876, −7615; | PA−4036, −7479; | PA−4127, −7386; | PA−4516, −7661; |
| PA−4837, −7777; | PA−5157, −7821; | PA−5501, −7754; | PA−5707, −7638; | PA−5957, −7365; |
| PA−6073, −7136; | PA−6096, −7113; | PA−6690, −7661; | PA−7010, −7798; | PA−7262, −7821; |
| PA−7468, −7754; | PA−7651, −7571; | PA−7720, −7319; | PA−7674, −6930; | PA−7514, −6586; |
| PA−7285, −6289; | PA−6873, −5968; | PA−6461, −5785; | PA−6119, −5717; | PA−5936, −5717; |
| PA−5913, −5694; | PA−5568, −5762, | PA−5501, −5831; | PA−5501, −5877; | PA−5545, −5923; |
| PA−6606, −5900; | PA−6279, −5991; | PA−6508, −6174; | PA−6760, −6472; | PA−6919, −6838; |
| PA−6943, −7044; | PA−6919, −7180; | PA−6827, −7273; | PA−6714, −7296; | PA−6575, −7273; |
| PA−6348, −7090; | PA−6096, −6791; | PA−5821, −6312; | PA−5774, −6174; | PA−5707, −6106; |
| PA−5661, −6106; | PA−5568, −6266; | PA−5386, −6930; | PA−5226, −7250; | PA−5020, −7455; |
| PA−4837, −7502; | PA−4562, −7455; | PA−4310, −7319; | PA−4242, −7250; | PA−4425, −6884; |
| PA−4539, −6449; | PA−4585, −5968; | PA−4562, −5442; | PA−4425, −4915; | PA−4288, −4572; |
| PA−4104, −4320; | PA−3830, −4091; | PA−3647, −4047; | PA−3418, −4070; | PA−3235, −4253; |
| PA−3120, −4503; | PA−3074, −4824; | PA−3097, −5396; | PA−3235, −5968; | PA−3464, −6518; |
| PA−3692, −6930; | PA−3486, −7226; | PA−3235, −7432; | PA−3053, −7502; | PA−2868, −7525, |
| PA−2502, −7409; | PA−2342, −7319; | PA−2319, −7296; | PA−2479, −6953; | PA−2595, −6426; |
| PA−2618, −6060; | PA−2548, −5396; | PA−2366, −4824; | PA−2206, −4503; | PA−1838, −4137; |
| PA−1655, −4070; | PA−1359, −4091; | PA−1176, −4276; | PA−1084, −4572; | PA−1061, −5190; |
| PA−1153, −5717; | PA−1359, −6289; | PA−1655, −6838; | PA−1771, −6997; | PA−1748, −7113; |
| PA−1519, −7342; | PA−1336, −7409; | PA−1153, −7386; | PA−970, −7273; | PA−649, −6838; |
| PA−214, −5900; | PA−54, 5808; | PA152, 5877; | PA312, −6129; | PA449, −6586; |
| PA−587, −7159; | PA655, −7226; | PA770, −7020; | PA1066, −6014; | PA1136, −5900; |
| PA1295, −5808; | PA1524, −5877; | PA1707, −6106; | PA1890, −6586; | PA2052, −7090; |
| PA2096, −7159; | PA2119, −7180; | PA2165, −7180; | PA2348, −6838; | PA2577, −6083; |
| PA2646, −5945; | PA2737, −5854; | PA2852, −5831; | PA2989, −5877; | PA3149, −6037; |
| PA3218, −6220; | PA3378, −6974; | PA3493, −7273; | PA3584, −7386; | PA3653, −7455; |
| PA3813, −7432; | PA4042, −7180; | PA4134, −6997; | PA4179, −6791; | PA4385, −6426; |
| PA4729, −6083; | PA5118, −5854; | PA5530, −5739; | PA5872, −5717; | PA6194, −5785; |
| PA6284, −5808; | PA6307, −5831; | PA6307, −5923; | PA6238, −5945; | PA5759, −5923; |
| PA5507, −6014; | PA5278, −6197; | PA5026, −6495; | PA4866, −6838; | PA4843, −7044; |
| PA4866, −7180; | PA5003, −7319; | PA5185, −7296; | PA5530, −6953; | PA5965, −6174; |
| PA5965, −6151; | PA6009, −6106; | PA6101, −6106; | PA6171, −6197; | PA6261, −6768; |
| PA6377, −7113; | PA6467, −7273; | PA6627, −7409; | PA6765, −7386; | PA6971, −7180; |
| PA7154, −6815; | PA7337, −6129; | PA7245, −5945; | PA7245, −5785; | PA7291, −5739; |
| PA7360, −5739; | PA7383, −5717; | PA7497, −5762; | PA7635, −5900; | PA8253, −5923; |
| PA8413, −6014; | PA8527, −6220; | PA8619, −7020; | PA8756, −7386; | PA8916, −5725; |
| PA9098, −7502; | PA9397, −7203; | PA9580, −6884; | PA9626, −5442; | PA9739, −4688; |
| PA9922, −4070; | PA10107, −3702; | PA10357, −3452; | PA10449, −3406; | PU; |
| PD; | PA10678, −3429; | PA10838, −3589; | PA10907, −3908; | PA10815, −4503; |
| PA10609, −5213; | PA10244, −6197; | PA10267, −6220; | PA10655, −5968; | PA10931, −5877; |
| PA11204, −5854; | PA11433, −5900; | PA11548, −5968; | PA11639, −6083; | PA11662, −6266; |
| PA11616, −6472; | PA11502, 6632; | PA11158, −6884; | PA10746, −7067; | PA10380, −7136; |
| PA10357, −7159; | PA10449, −7365; | PA10655, −7615; | PA11044, −7867; | PA11296, −7960; |
| PA11776, −8027; | PA12143, −8050; | PA12792, −7960; | PA13287, −7708; | PA13928, −7296; |
| PA14110, −7159; | PA14133, −7159; | PA14110, −7273; | PA13652, −7844; | PA13217, −8256; |
| PA12669, −8577; | PA12211, −8691; | PA11914, −8714; | PA11479, −8645; | PA11090, −8485; |
| PA10792, −8256; | PA10426, −7844; | PA10151, −7365; | PA10128, −7342; | PA10084, −8096; |
| PA9991, −8256; | PA9878, −8325; | PA9716, −8302; | PA9626, −8210; | PA9580, −8027; |
| PA9580, −7250; | PA9556, −7226; | PA9283, −7592; | PA8962, −7821; | PA8642, −7890; |
| PA8334, −7821; | PA8115, −7592; | PA8001, −7342; | PA7909, −6768; | PA7886, −6289; |
| PA7863, −6197; | PA7772, −6106; | PA7566, −6106; | PA7497, −6174; | PA7406, −6632; |
| PA7245, −7090; | PA7018, −7502; | PA6719, −7777; | PA6513, −7844; | PA6171, −7821; |
| PA5896, −7661; | PA5620, −7273; | PA5620, −7226; | PA5597, −7203; | PA5026, −7731; |
| PA4820, −7821; | PA4500, −7798; | PA4317, −7684; | PA4156, −7479; | PA4156, −7432; |
| PA4111, −7386; | PA3744, −7731; | PA3584, −7821; | PA3378, −7844; | PA3149, −7798; |
| PA2899, −7548; | PA2737, −7203; | PA2623, −6768; | PA2600, −6747 | PA2531, −6815; |
| PA2348, −7386; | PA2235, −7592; | PA2029, −7777; | PA1846, −7821; | PA1663, −7754; |
| PA1457, −7502; | PA1228, −6907; | PA1159, −6655; | PA1113, −6609 | PA1066, −6655; |
| PU; | | | PA1823, −1712; | PD; |
| PA2211, −1826; | PA2302, −1918; | PA2302, −1987; | PA2142, −2101; | PA1388, −2261; |
| PA381, 2307; | PA237, −2284; | PA−924, −2193 | PA−1336, −2055 | PA−1405, 1987 |
| PA−1382, −1872 | PA−1130, −1758 | PA−420, −1643; | PA15, −1598; | PA1113, −1620; |
| PA1823, −1712, | PU; | PA−1426, −4276; | PD; | PA−1313, −4482; |
| PA−1267, −4801; | PA−1290, −5373; | PA−1473, −6060; | PA−1655, −6495 | PA−1838, −6768; |
| PA−1884, −6724; | PA−2000, −5854; | PA−1977, −5327; | PA−1817, −4595; | PA−1702, −4343; |
| PA−1565, −4230; | PA−1426, −4276; | PU; | PA−3464, −4276; | PD |
| PA−3349, −4435; | PA−3303, −4709; | PA−3326, −5511; | PA−3486, −6083; | PA−3692, −6562; |
| PA−3761, −6655; | PA−3876, −6357; | PA−3944, −5808; | PA−3921, −4984; | PA−3807, −4482; |
| PA−3692, −4297; | PA−3624, −4253; | PA−3464, −4276; | PU; | PA10197, −4549; |
| PD; | PA10313; −3841; | PA10426, −3612; | PA10473, −3566; | PA10586, −3566; |
| PA10655, −3702; | PA10678, −3931; | PA10563, −4595; | PA10357, −5305 | PA10151, −5900; |
| PA10197, −4549; | PU; | PA10449, −6335, | PD; | PA10725, −6129; |

APPENDIX A-continued

EXAMPLE HPGL FILE

| PA10769, −6106; | PA10931, −6106; | PA10998, −6174; | PA10975, −6380; | PA10861, −6562; |
| PA10540, 6838; | PA10290, −6953; | PA10151, −6953; | PA10128, −6884; | PA10220, −6632; |
| PA10449, −6335; | PU; | PA0; | | |

We claim:

1. A method of bonding a layer to a substrate, the method comprising the steps of: placing the layer on the substrate; and directing a laser beam onto the layer to activate an adhesive disposed between the layer and the substrate to bond the layer to the substrate.

2. The method of claim 1, wherein the directing step comprises the step of moving the laser beam along a path represented by a trace profile.

3. The method of claim 1, wherein the directing step comprises the step of moving the laser beam along a plurality of vectors defining a path on the layer.

4. The method of claim 1, wherein the directing step comprises the step of controlling the heat of the laser beam to increase or decrease the thickness of a bonded region along which the layer and the substrate are bonded.

5. The method of claim 1, wherein the directing step comprises the step of controlling the heat of the laser beam to change the color of the layer.

6. The method of claim 1, wherein the directing step comprises the step of moving the laser beam along a closed path to puff the layer away from the substrate within the closed path.

7. The method of claim 6, wherein the directing step further comprises the step of repeating the moving step to further puff the layer away from the substrate within the closed path.

8. The method of claim 1, wherein the directing step comprises the step of grouping commands within the trace profile according to the portion of the path they represent.

9. The method of claim 1, wherein the directing step comprises the step of grouping commands within the trace profile according to one or more beam profiles associated with one or more of the commands.

10. The method of claim 1, further comprising the step of directing the laser beam onto the layer to cut away an excess portion of the layer.

11. The method of claim 1, wherein the directing step comprises the step of controlling the pulse width of the laser beam to increase or decrease the distance between successive portions of a bonded region along which the layer and the substrate are bonded.

12. A method of bonding a layer to a substrate, the method comprising the steps of placing the layer on the substrate; and directing a laser beam onto the layer in a closed path to bond the layer to the substrate, wherein heat from the laser beam causes the layer to puff away from the substrate within the closed path.

13. The method of claim 12, further comprising the step of repeating the directing step to further puff the layer away from the substrate within the closed path.

14. The method of claim 12, further comprising the step of directing the laser beam onto the layer to cut away an excess portion of the layer.

15. The method of claim 12, further comprising the step of directing the laser beam onto the layer to bond a portion of the layer outside of the closed path to the substrate such that the portion is flatter than the portion of the layer inside the closed path.

16. The method of claim 12, wherein the directing step comprises the step of moving the laser beam along a path represented by a trace profile.

17. The method of claim 12, wherein the directing step comprises the step of moving the laser beam along a plurality of vectors defining a path on the layer.

18. The method of claim 12, wherein the directing step comprises the step of controlling the heat of the laser beam to increase or decrease the thickness of a bonded region along which the layer and the substrate are bonded.

19. The method of claim 12, wherein the directing step comprises the step of controlling the heat of the laser beam to change the color of the layer.

20. A method of bonding a layer of thermoplastic material to a paper substrate, the method comprising the steps of: placing the layer on the substrate, and directing a laser beam onto the thermoplastic layer to melt a local area of the thermoplastic layer, thereby bonding the thermoplastic layer to the paper substrate.

21. A method of decorating a greeting card, the method comprising the steps of: placing a layer of decorative material on a greeting card stock; and directing a laser beam onto the layer to activate an adhesive disposed between the layer and the card stock to bond the layer to the greeting card stock.

22. A method of bonding a layer to a substrate, the method comprising the steps of: placing the substrate on the layer; and directing a laser beam onto the substrate to activate an adhesive disposed between the layer and the substrate to bond the layer to the substrate.

* * * * *

UNITED STATES PATENT AND TRADEMARK OFFICE
CERTIFICATE OF CORRECTION

PATENT NO. : 6,440,254 B1
DATED : August 27, 2002
INVENTOR(S) : Barbara J. Rich and Larry E. Williams It is certified that error appears in the above-identified patent and that said Letters Patent is hereby corrected as shown below:

Column 3,
Line 61, "the 10 degree" should read -- the degree --.

Column 8,
Line 36, "oftime" should read -- of time --.

Column 13,
Line 14, "PA-6606" should read -- PA 6026 --.

Signed and Sealed this

Twenty-eighth Day of January, 2003

JAMES E. ROGAN
*Director of the United States Patent and Trademark Office*